US012508199B2

(12) United States Patent
Faii Ong et al.

(10) Patent No.: US 12,508,199 B2
(45) Date of Patent: Dec. 30, 2025

(54) TREMOR STABILISATION APPARATUS

(71) Applicant: GYROGEAR LIMITED, London (GB)

(72) Inventors: Joon Faii Ong, London (GB); Benjamin Koh, London (GB); Elliott Baxter, London (GB); Youssef Ibrahim, London (GB); Stephen Knight, London (GB); Paul de Panisse Passis, London (GB)

(73) Assignee: GYROGEAR LIMITED, London (GB)

( * ) Notice: Subject to any disclaimer, the term of this patent is extended or adjusted under 35 U.S.C. 154(b) by 716 days.

(21) Appl. No.: 17/596,454

(22) PCT Filed: Jun. 12, 2020

(86) PCT No.: PCT/GB2020/051435
§ 371 (c)(1),
(2) Date: Dec. 10, 2021

(87) PCT Pub. No.: WO2020/249975
PCT Pub. Date: Dec. 17, 2020

(65) Prior Publication Data
US 2022/0304888 A1 Sep. 29, 2022

(30) Foreign Application Priority Data
Jun. 12, 2019 (GB) ..................................... 1908448

(51) Int. Cl.
*A61H 23/02* (2006.01)

(52) U.S. Cl.
CPC . *A61H 23/0254* (2013.01); *A61H 2201/1638* (2013.01); *A61H 2201/165* (2013.01); *A61H 2201/5002* (2013.01); *A61H 2205/065* (2013.01)

(58) Field of Classification Search
CPC .. A61H 23/00–006; A61H 23/02–0263; A61H 2201/1635–1638; A61H 2201/165; A61H 2201/5002; A61H 2205/065
See application file for complete search history.

(56) References Cited

U.S. PATENT DOCUMENTS

| | | | | |
|---|---|---|---|---|
| 4,842,607 | A | 6/1989 | Repperger et al. | |
| 5,058,571 | A * | 10/1991 | Hall | A63B 23/16 601/87 |

(Continued)

FOREIGN PATENT DOCUMENTS

| | | | |
|---|---|---|---|
| CN | 107405209 | A | 11/2017 |
| ES | 2319022 | A1 | 5/2009 |

(Continued)

OTHER PUBLICATIONS

International Search Report and Written Opinion in International Application No. PCT/GB2020/051435 mailed Nov. 30, 2020.

(Continued)

*Primary Examiner* — Rachel T Sippel
(74) *Attorney, Agent, or Firm* — Greenberg Traurig LLP; David J. Dykeman; Kristopher Reichlen

(57) ABSTRACT

The present invention relates to apparatus for stabilisation of tremors, both physiological and pathological, of parts of the body, especially the hands. We describe an apparatus for reducing effects of tremors on an area of the human body, the apparatus comprising a gyroscope device and an attachment assembly for attachment of the gyroscope device to a location on the human body in the area, wherein the attachment assembly provides a substantially inelastic attachment to the location and comprises a gyroscope mount. The gyroscope mount comprises a substantially stiff first plate having a shape adapted to substantially correspond with a shape of the human body in the location. In preferred embodiments, the attachment assembly further comprises a (Continued)

second plate mountable to the body such that a clamping force is appliable between the first plate and the second plate.

15 Claims, 15 Drawing Sheets

(56) References Cited

U.S. PATENT DOCUMENTS

| | | | | |
|---|---|---|---|---|
| 5,337,737 | A | 8/1994 | Rubin et al. | |
| 6,730,049 | B2 * | 5/2004 | Kalvert | A63B 21/4017 601/87 |
| 11,918,499 | B1 * | 3/2024 | Madere | A61F 5/0118 |
| 2003/0236475 | A1 | 12/2003 | Kalvert | |
| 2004/0176714 | A1 | 9/2004 | Darcey | |
| 2013/0237892 | A1 * | 9/2013 | Wardlaw | A61F 5/05858 602/20 |
| 2015/0272807 | A1 | 10/2015 | Gupta et al. | |
| 2017/0290698 | A1 | 10/2017 | Elias et al. | |
| 2017/0354543 | A1 * | 12/2017 | Mazourik | A61H 1/008 |
| 2018/0266820 | A1 | 9/2018 | Panisse et al. | |
| 2018/0289309 | A1 | 10/2018 | Chen et al. | |
| 2020/0188223 | A1 * | 6/2020 | Nguyen | A61H 23/004 |

FOREIGN PATENT DOCUMENTS

| | | | |
|---|---|---|---|
| WO | 2014080045 | A1 | 5/2014 |
| WO | 2015/187712 | A1 | 12/2015 |
| WO | 2016/102958 | A1 | 6/2016 |
| WO | 2019075185 | A1 | 4/2019 |

OTHER PUBLICATIONS

Search and Examination Report mailed Nov. 29, 2019 in Corresponding United Kingdom Patent Application No. GB1908448.2 (9 pages).

Search and Examination Report mailed Jan. 10, 2022 in Corresponding United Kingdom Patent Application No. GB2117518.7 (7 pages).

11202113759P; Search Report; Intellectual Property Office of Singapore; Date: Aug. 6, 2023; By: Authorized Officer: Ong Yee Kang.

* cited by examiner (a)

(b)

(a)

(b)

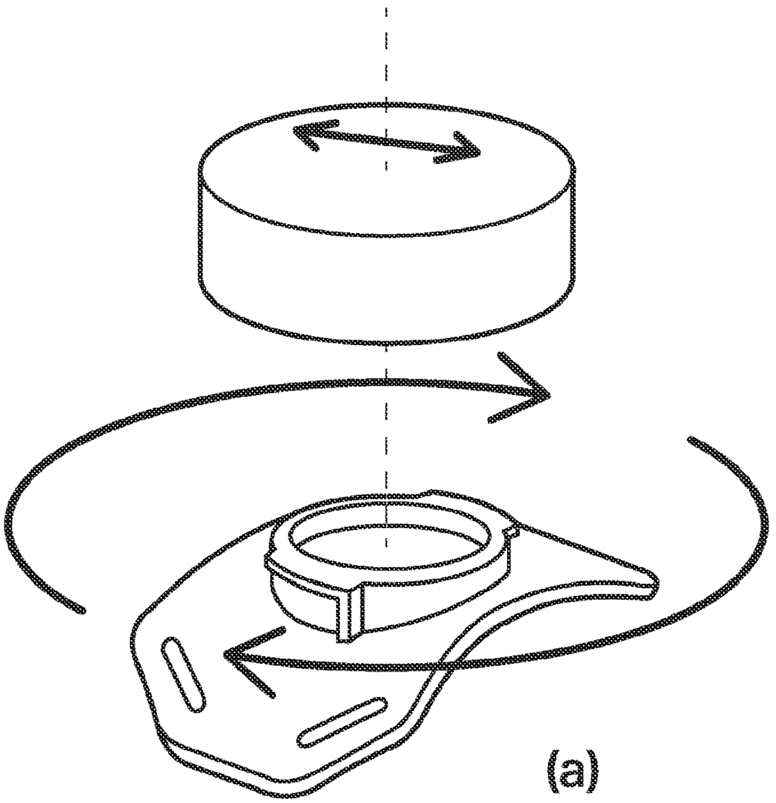
(a)
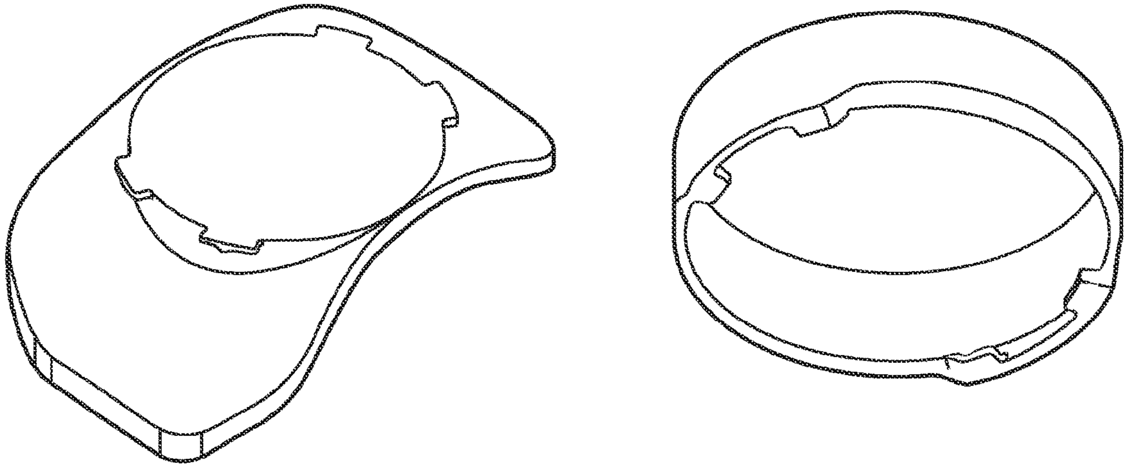
(b)
Fig. 9iii

TREMOR STABILISATION APPARATUS

RELATED APPLICATIONS

This application is a U.S. national phase application of PCT International Patent Application No. PCT/GB/2020/051435, filed on Jun. 12, 2020, which claims the benefit of and priority to GB Patent Application No. 1908448.2, filed Jun. 12, 2019, each of which is hereby incorporated by reference in its entirety.

FIELD OF THE TECHNOLOGY

The present invention relates to apparatus for stabilisation of tremors, both physiological and pathological, of parts of the body, especially the hands.

BACKGROUND

Involuntary muscle tremors occur in a range of neurological conditions, notably degenerative conditions such as Parkinson's disease, essential tremor, multiple sclerosis and so on; and other conditions exhibiting similar effects.

SUMMARY

Numerous proposals for mediating hand tremors using gyroscopes have been proposed. U.S. Pat. No. 5,058,571 describes an early proposal in which a battery-driven gyroscope is held against the back face of the hand by a strap. A gyroscope seeks to maintain the orientation of its spinning axis and resists any action that seeks to cause a change in that orientation. Thus the theory of using a gyroscope is that the onset of a muscle tremor causes a movement in the hand but the gyroscope acts against that movement, substantially cancelling out the tremor.

However, as noted in U.S. Pat. No. 6,730,049, the device of U.S. Pat. No. 5,058,571 is capable only of reducing involuntary movement in one planar direction. However, involuntary movements are rarely one-dimensional with respect to arm movement. U.S. Pat. No. 6,730,049 proposes a rigid splint to bind the user's lower arm, wrist and hand, essentially completely immobilising all of the joints of the limb from the elbow downwards, leaving just the joints of the distal phalanges of the thumb and fingers free to flex. Thus any involuntary movement within the bound area, irrespective of dimension, is transferred to the splint. A gyroscope is mounted to the splint in such a position that it counters this movement. In some embodiments, two gyroscopes are mounted to the splint with their rotational axes mounted orthogonally to one another. The device is claimed to be tuneable to a particular patient's tremor profile by adjustment of the location of the gyroscope along the length of the splint. However, the stabilising effect of the very high mass of the device will, in fact, substantially outweigh any effect of relocation along the splint. Furthermore, adjustment along the length of the splint presupposes that the tremor is focussed about the elbow. As such, the device has little effect on hand tremors.

However, the skilled person will immediately appreciate that this device prevents all free movement within the lower arm other than of the fingers. Even movement of the thumb is considerably restricted, severely limiting the patient's range of activities, potentially exacerbating the practical consequences of the patient's condition rather than alleviating it.

Accordingly, there is a need for improved tremor stabilisation techniques. In our earlier application, WO 2016/102958, we describe a gyroscopic device mounted within a housing in such a way that the gyroscope disc is able to precess with respect to the housing. The housing is mounted to a glove, by means of which the device can be worn by a patient. Having developed a highly effective gyroscopic device, we now turn our attention to the means by which the device is mounted to the patient in the area subject to tremors.

As discussed above, U.S. Pat. No. 6,730,049 teaches essentially that tremor can be stabilised only by immobilisation of the entire limb. In the embodiment described in this publication, the distal phalanges are left able to flex to allow a small degree of digital function to remain. Accordingly, there is a need for a system for mounting a gyroscopic device to a limb in such a way that the forces of tremors are reliably transferred to the gyroscopic device, where they can be balanced, without unduly impeding normal use of the limb.

In its broadest sense, the present invention provides an apparatus for reducing effects of tremors on an area of the human body, the apparatus comprising a gyroscope device and an attachment assembly for attachment of the gyroscope device to a location on the human body in the area, wherein the attachment assembly provides a substantially inelastic attachment to the location and comprises a gyroscope mount; characterised in that the gyroscope mount comprises a substantially stiff first plate having a shape adapted to substantially correspond with a shape of the human body in the location.

Preferably, the substantially inelastic attachment comprises at least one substantially inelastic strap attachable to the first plate and securable around and/or against the location.

Preferably the strap includes a tension or tightness indication system.

Optionally, the substantially inelastic attachment comprises a demountable cuff formed of a substantially inelastic material.

Optionally, the cuff is in the form of a glove or part of a glove attachable to a hand.

Advantageously, the substantially inelastic attachment is formed of a first polymeric material which is substantially inelastic embedded within a second polymeric material which may be substantially inelastic or elastic.

The second polymeric material may be a synthetic rubber, preferably a neoprene or polychloroprene rubber.

Preferably, the substantially inelastic attachment is demountable to the area of the human body.

Preferably, the attachment is demountable by means of a fastening device orientated longitudinally with respect to the area of the human body.

Preferably, the fastening device is a zip fastening device.

Preferably, the zip fastening device runs substantially the entire length of the substantially inelastic attachment.

Preferably, the zip fastening device has a zip puller and the zip fastener device is orientated such that mounting of the apparatus to the human body is achieved, in use, by a pulling action on the zip puller.

Preferably, the attachment assembly further comprises a second plate mountable to the body such that a compression or clamping force is appliable between the first plate and the second plate.

In one embodiment, the second plate is substantially stiff.

In an alternative embodiment, the second plate has a degree of flexibility.

Preferably, the second plate is a perforated plate.

Preferably, at least one of the first plate and the second plate is formed of a polymeric material, a metal, a metal alloy, wood or a composite material.

Preferably, the compression or clamping force is about 50 N or more, preferably about 100 N or more.

Preferably, the compression or clamping force is about 300 N or less, preferably about 200 N or less.

The compression or clamping force may be in the range of from 50 to 300 N, optionally 100-200 N.

Preferably, the first plate is substantially rigid.

Preferably, the gyroscope device includes a gyroscope housing and the gyroscope housing and gyroscope mount include mutually interacting elements such that the gyroscope housing is demountable from the gyroscope mount, preferably wherein the interacting elements include a positive locking feature to retain the gyroscope housing mounted to the gyroscope mount.

Optionally, the interacting elements provide a slide-to-lock fitting, a bayonet fitting or a twist-to-lock fitting.

Advantageously, the area of the body is a hand and the first plate is dimensioned so as not to overlie, in use, the proximal and distal phalanges of the thumb.

Preferably, the first plate has a generally annular sectoral shape having an outer curvature corresponding generally to the curvature of the knuckles of the hand.

Preferably, the first plate is dimensioned so as not to overlie, in use, the knuckles of the hand.

Preferably, the second plate is dimensioned so as not to extend, in use, to the knuckles of the hand or to the proximal and distal phalanges of the thumb.

Preferably, the attachment assembly further comprises a visual indication system to indicate when the attachment assembly is applied, in use, with a correct force or tension against the location.

Advantageously, the attachment assembly further comprises a passive tremor stabilisation component.

Preferably, the passive tremor stabilisation component comprises a stretchable fabric shaped and dimensioned to be appliable to or around the location.

Preferably, the component extends beyond the location and has provides different compressive characteristics along a length of the component.

Preferably, the compressive characteristics are in the range of 1.7 kpa to 4.8 kpa (13 mmHg and 36 mmHg) as measured according to BSI 661210:2018.

Preferably, the gyroscope device includes an electrically driven motor and wherein the apparatus further comprises a power pack and control system for the motor of the gyroscope device.

Preferably, the power pack is demountably attachable to the apparatus at a position remote the gyroscope attachment assembly.

Preferably, the power pack is electrically couplable to the gyroscope device by means of a demountable electrical connector.

Preferably, the demountable electrical connector is a self-orientating electrical connector.

Preferably, the demountable electrical connector comprises a magnetic power connector wherein the connector comprises first and second connector elements and wherein each element comprises a magnet of opposite polarity to a positionally corresponding magnet in the other element.

Preferably, the power pack is mountable adjacent the area of the human body.

In some embodiments, the gyroscopic device comprises at least one control moment gyroscope or at least one reaction wheel.

In some embodiments, the apparatus comprises at least one vibrational unit.

In some embodiments, the apparatus comprises a plurality of gyroscopic devices.

Preferably, the apparatus further comprises a joint stabilisation apparatus.

Preferably, the gyroscope mount is mountable to the human body adjacent a joint and to one side thereof and wherein the joint stabilisation apparatus comprises a generally elongate linkage having first and second ends, wherein the first end is coupled to the gyroscope mount and the second end is couple to a joint movement retardation device mountable to a second side of the joint, wherein the joint movement retardation device is adapted to apply a retardation force to the second end of the linkage to counter flexing of the joint.

Preferably, the first end of the linkage includes a universal joint.

In one embodiment, the joint stabilisation device comprises or further comprises an elastic hysteresis device adapted to apply an elastic stabilising force to the gyroscope mount.

Preferably, the gyroscope mount is mountable to the human body adjacent a joint and to a first side thereof and wherein the elastic hysteresis device comprises a band or strap securable to a second side of the joint and further comprising a linkage comprising first and second elastic members, each member being oppositely disposed above and below the hinge axis of the joint.

In an alternative embodiment, the joint movement retardation device comprises a frictional device adapted to apply a frictional stabilising force to the second end of the linkage.

In a further alternative embodiment, the joint movement retardation device comprises a braking disc assembly comprising a sensor to sense a movement of the second end of the linkage and an electromagnetically actuatable disc brake actuatable, in response to an input from the sensor, to apply a braking force to the second end of the linkage.

In a yet further alternative embodiment, the joint movement retardation device comprises a dashpot coupled to the second end of the linkage.

In a further alternative embodiment, the joint movement retardation device comprises a magneto-rheological damping device coupled to the second end of the linkage.

BRIEF DESCRIPTION OF THE DRAWINGS

The above and other aspects of the present invention will now be described in further detail, by way of example only, with reference to the accompanying figures, in which.

DETAILED DESCRIPTION

Figure 1:
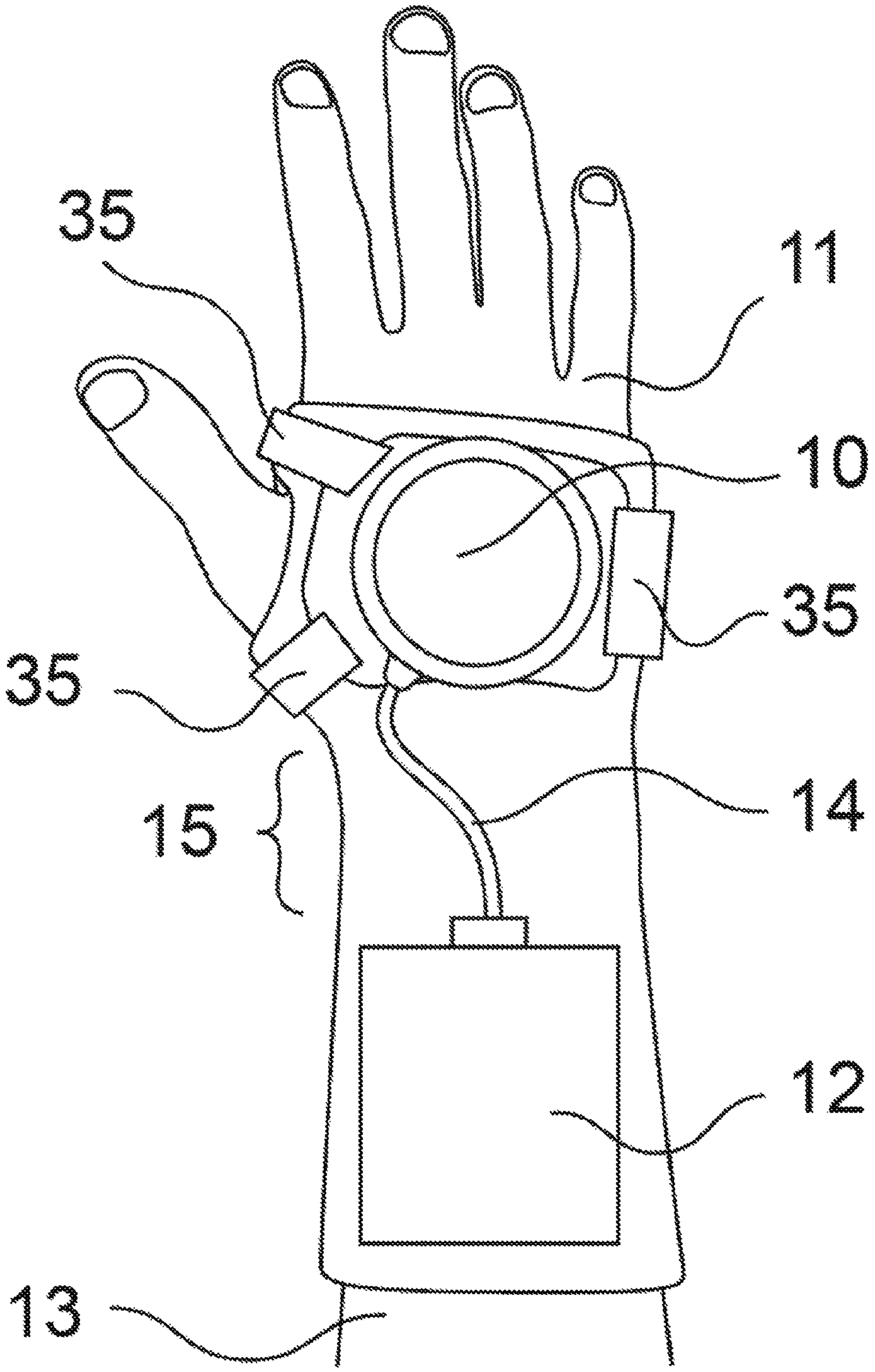
FIG. 1 is a plan view of a first embodiment of an apparatus in accordance with the present invention.

FIG. 1 illustrates a tremor stabilisation apparatus in accordance with the present invention for reducing the effects of tremor of the hand and also illustrates a first embodiment of an apparatus in accordance with the present invention. The principles described are equally applicable to tremor reduction on other areas of the body. As shown, conveniently, a gyroscope unit 10, is mountable to the back of a hand 11 of a patient experiencing tremors. By the terms gyroscopic device, gyroscope, gyroscope unit and synonyms thereof, as used herein, it is intended to describe an apparatus which performs as a gyroscope and, in the context of the present invention, generally describes any device comprising a rotatable disc or wheel, such as a flywheel, caused to rotate about an axis (the gyroscope axis) by means of an electric motor or other suitable driving mean such as a hydraulic or pneumatic turbine. One such electrically driven device is described in our earlier application, WO 2016/102958, and the precise arrangement of the gyroscope will not be described in any further detail herein.

The apparatus of the present invention provides a resilient mounting for the gyroscope unit to the body such that the gyroscope axis remains substantially normal to the surface in use and during activity of the wearer.

The electric motor requires a power pack or power supply unit 12, which is conveniently mountable to the forearm 13 of the patient and linked to the gyroscope unit 10 by a cable 14. With this arrangement, the weight of the apparatus is shared between the hand and the forearm whilst maintaining full freedom of movement about the wrist area 15. Since it is known that a stationary mass can also be helpful in reducing the magnitude of tremors, it can be advantageous to mount the power pack directly to the gyroscope unit or construct the power pack within the gyroscope unit. However, it has been found that some users prefer to have a distributed power supply arrangement in which (at least some of) the power supply battery cells are distributed to other areas of the body. Having the power pack distributed around the forearm brings it closer to the centre of mass of the arm, making it easier to carry and control the weight of the unit. Despite the nett weight being the same as if the power pack is carried by the gyroscope unit or is otherwise not distributed, in preliminary trials, some users expressed a preference for distributed power.

The apparatus as a whole also includes a control unit (not shown) to control operation of the gyroscope. The control unit is conveniently distributed between the gyroscope unit 10 and power supply unit 12 housings but may, alternatively, be housed wholly or substantially within either of the units. In alternative embodiments, not shown, the power supply unit 12 is formed integrally with the gyroscope unit.

Figure 2:
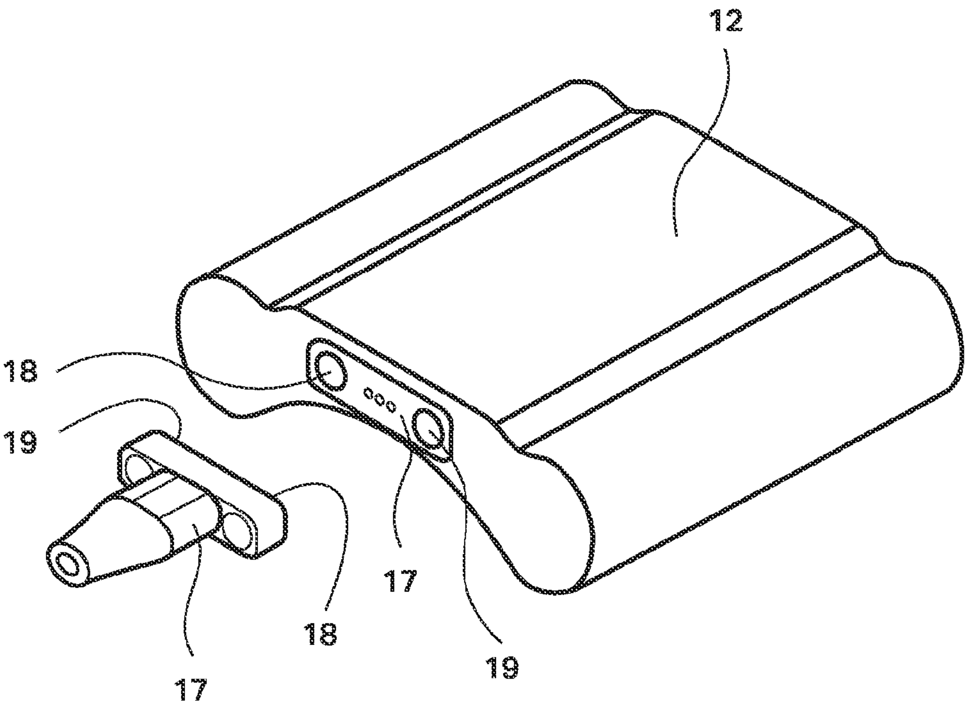
FIG. 2 is a perspective view of the main components of a power pack unit of an embodiment of an apparatus in accordance with the present invention.

In preferred embodiments, as shown in FIG. 2, the power supply unit 12 is electrically couplable to the gyroscope device by means of a demountable electrical connector. More preferably, the demountable electrical connector comprises a magnetic, self-aligning power connector in which the connector comprises a first connector element 16 forming a part of the power supply unit 12 and a second connector element 17 attached to an end of the cable 14 linking to the gyroscope assembly. Each element 16, 17 has at least one magnet 18 of opposite polarity to a positionally corresponding magnet 19 in the other element. The magnets may be arranged to urge the connectors to couple in a specific directional configuration or may be arranged simply to have opposite polarities between the first connector element and the second connector element. The first configuration may be advantageous in assemblies in which the connector is used for transmitting data to a control unit within the power supply unit 12 or gyroscope unit, or externally from the device (for device diagnostics, clinical diagnostics and so on) as well as for electricity connection. By this arrangement, a patient who, it must be recalled, will typically be experiencing tremors whilst attempting to apply the apparatus, can easily connect the gyroscope assembly to the power supply unit 12 by means of a gross location of the connector to the power supply unit 12, allowing the magnetic arrangement to correctly self-align the electrical terminals to complete the electrical connection. Equally, detachment of the electrical supply to the gyroscope assembly can be achieved rapidly without the need for fine motor skills. The same connector can be used for charging the power unit.

The power supply unit 12 contains sufficient battery cells of sufficient charge capacity for powering the gyroscope assembly to achieve a therapeutically appropriate level of tremor stabilisation for the area of the body being treated for an adequate period of time. In the embodiment shown, the power supply unit 12 is provided in a power supply housing which is shaped to correspond with the shape of the area of the body upon which the unit will, in use, be mounted. For example, if the unit is intended to be worn on the lower arm or another limb, the unit advantageously has a curved limb-facing surface. If the unit is intended to be mounted on a leg, the curvature may be less and if the unit is intended to be carried on the torso, a substantially flat surface may provide a better fit. The unit may include a conformal layer in the form of padding to improve the comfort of the fit.

Suitably, the unit is secured in place by straps (not shown). It will be appreciated that a plurality of discrete power supply units 12 may be used, connected in series or parallel as required, to distribute the weight of the power supply units 12 more widely and/or to provide a longer service period before the cells need recharging.

In the preferred embodiments, the power supply unit 12 includes a power switch, a battery charge indicator to indicate the level of charge remaining in the battery and a power indicator to indicate when the unit is operative. The unit will also, in preferred embodiments, include a power management controlled as is well known in the field of rechargeable battery devices, especially lithium ion batteries, including battery protection measures to protect, for example, against over and under voltages, overcurrents, short circuits and overheating. The power supply unit also acts, in preferred embodiments, to provide impact and shock protection to the cells and deformation resistance.

Advantageously, the power supply unit 12 further includes a display to display these and other parameters relating to the use of the apparatus of the present invention. In alternative embodiments, not shown, the display is provided in the gyroscope unit 10. Other parameters may derive from other sensors associated with the apparatus. The sensors may be mounted on or within the apparatus or may be mounted elsewhere on the body and linked to the apparatus. For example, the apparatus may include sensors relating to physiological parameters which may provide useful data for a patient or clinician, such as ECG, EEG, EMG, respiration, $SpO_2$, temperature, heart rate, sleep tracking, metabolite and sweat sensors, accelerometers, fall sensors, touch sensors etc. and may include input devices such as a microphone or camera. The sensors may include environmental functions, such as a global positioning satellite receiver, air quality and UV exposure sensors. There may be a single sensor or multiple sensors for a single parameter, distributed throughout a support for the apparatus. The display may be an interactive display, allowing the cycling of the view on the display and interaction with the control unit. The apparatus may also include an emergency alarm system, a reminder system, such as a reminder to take medication, and may include a solid state memory for storing data relating to use of the apparatus and, for example, medical records for the patient. The display may also be used to display cautionary and/or adverse event warnings, relating to the operation of the apparatus. The control system may further include network communications capability, such as WiFi (registered trade mark) and mobile telephony capabilities. Communications capability is particularly advantageous in transmitting clinical data to alerting the emergency services in the event of an adverse condition either of the apparatus or relating to the patient.

In preferred embodiments, the apparatus includes a freefall sensor to sense when the apparatus may have been dropped, in response to which the control system places the device into an operational controlled damage state, in which rotation of the gyroscope is maintained at a reduced speed, or stops rotation of the gyroscope. For example, the control system may trigger an immediate locking and powering down of the gyroscope when sharp acceleration (indicating a fall) above a threshold value is detected. When the apparatus is re-started, the apparatus enters a diagnostic mode and if abnormal behaviour is indicated the operational controlled damage state, may allow rotation of the gyroscope to be maintained at a reduced speed to provide an ongoing degree of tremor stabilisation or, if damage appears to be more substantial, stops rotation of the gyroscope. If no abnormal behaviour is indicated, the apparatus continues to boot as normal.

The apparatus may also include haptic feedback elements to act as warnings and reminders to the user of the device. For example, the power pack of the apparatus may be covered, in use, by clothing and so haptic feedback, for example in the form of vibrations, can be used to prompt the user to view the display and for other actions.

The vibration functionality can be built into the power pack or the gyroscope unit or provided elsewhere on the apparatus using conventional devices, such as one or more piezoelectric devices or micromotors having an eccentrically-mounted mass. The vibration functionality can be applied further to provide continuous or periodic vibrations to the area of the body. Application of vibrational forces to areas of the body subject to tremors has been found to provide additional stabilisation of the tremors and provide a relaxing feeling to the user which, in turn, can lead to lower tremor amplitudes.

In certain embodiments, the apparatus further comprises heating and/or cooling elements. It has been found that both heat and cold can have an impact on the severity of patient tremor. Accordingly, inclusion of a heating and/or cooling functionality can further aid tremor control.

The gyroscope unit 10, in some examples, may include a single gyroscope or multiple gyroscopes, housed within a single housing or in multiple discrete housings.

As described in our earlier application, WO 2016/102958, the gyroscopic device advantageously includes a precession mechanism such that the at least one gyroscope is able to precess with movement of the apparatus, to exert the necessary force on the target area. In the case of a plurality of gyroscopes, each gyroscope may have an individual precession mechanism or the plurality of gyroscopes may be mounted on a common precession system.

In the case of a gyroscope unit comprising a group or plurality of gyroscopes, each gyroscope of the group is advantageously controllable individually. For example, the switching on and off of the gyroscope may be controlled individually, as may the motion and precession of each gyroscope or the rotational speed of the rotating disc of the gyroscope, under the control of the control unit, to vary the angular momentum of the gyroscope and thus torque produced by the gyroscope unit.

In certain example embodiments, the gyroscope, or at least one of a plurality of gyroscopes, is an active gyroscope under active control by the control unit. For example, such a gyroscope may comprise a reaction wheel assembly or a control moment gyroscope.

A reaction wheel assembly traditionally requires at least three reaction wheels, one reaction wheel for each axis of pitch, roll and yaw. The reaction wheel assembly allows the gyroscope unit to exert a specified counter-torque about any desired axis in response to movement of the apparatus. In preferred embodiments, the apparatus includes sensors to sense movement of the hand, or other body part, such that the control system may be programmed to operate as an active control system is able to adjust the angular velocities of the reaction wheels. When the apparatus is attached to the hand or other respective body part, the motion of the device can be tracked and the control systems can impart the necessary torque impulses to interfere with unwanted tremor motion. This may be adapted to include predictive control based on previous learning by the control system to distinguish between, and anticipate, involuntary tremor motion and normal voluntary motion. As each motor accelerates or decelerates the spin of the reaction wheel flywheels, a counter-torque is applied back to the body which is proportional to the size of the reaction wheel flywheel and the magnitude of the acceleration or deceleration. Accordingly, to rotate the body part clockwise about the y-axis, the flywheel with the spin axis aligned with the y-axis will be spun in the anticlockwise direction by a torque applied from the motor at the desired rate. Movement of the hand is monitored on a continuous basis and the operation of the reaction wheels adjusted in real time to counter any tremors.

To conserve the total angular momentum of the whole system, which is zero, the flywheel exerts the same amount of torque about the same axis but in the opposite direction, applying this impulse to the body part through the motor mount assembly. To stop at a certain orientation, the motor is turned off and the relevant reaction wheels are braked, with a deceleration rate equal to the desired rate of deceleration of the body part.

In the modification using a control moment gyroscope (CMG), rather than changing wheel speed, gyroscope orientation is changed. CMGs have initial angular momentum, unlike reaction wheels. The magnitude of the angular momentum is controlled by the primary motor and is proportional to the initial wheel spin speed. Within the CMG, the flywheel is mounted with or within a motorised gimbal mount. A secondary motor or motors may be attached to the axis or axes of the gimbal mount. The secondary motor(s) apply torque to alter the axis of rotation of the flywheel. Given the gyroscopic effect, the resultant torque is perpendicular to the torques acting on the CMG. This resultant torque is applied to the entire CMG assembly and coupled through the flywheel gimbal mount to the attached body part.

The CMG, or plurality of CMGs, are controlled by a positional control system or equivalent within the apparatus. The positional control system draws on positional data from the inertial measurement units within the system.

In some embodiments, only certain axes are selected for control, such as roll only, pitch only, roll and pitch only and so on; thereby reducing the number of gyroscopes and control system complexity if required.

In the preferred embodiments, the gyroscopic device 10 and power supply 12 are conveniently provided as demountable components, with the apparatus including a gyroscope mount 20 and a power supply mount 21 respectively. Mounting the devices will be discussed further below.

Figure 3:
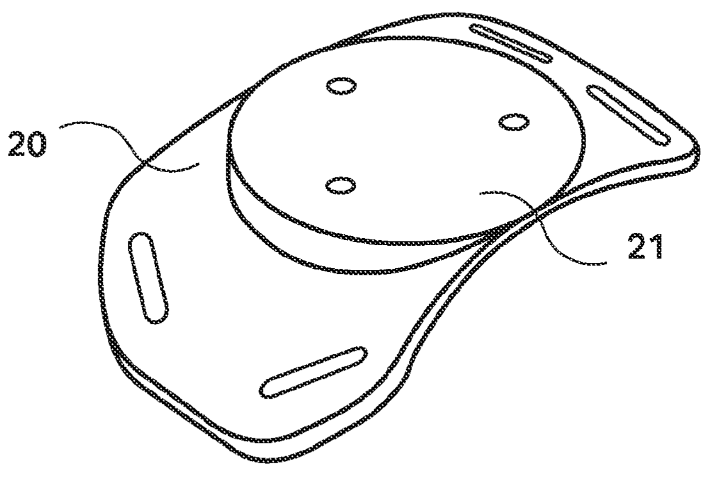
FIG. 3 is a perspective view of a first plate of an embodiment of an apparatus in accordance with the present invention.
Figure 4:
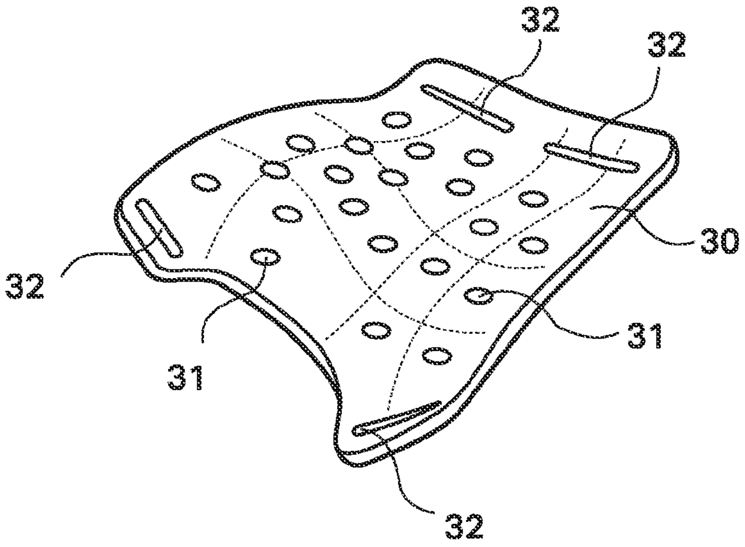
FIG. 4 is a perspective view of a second plate of an embodiment of an apparatus in accordance with the present invention.

FIGS. 3 and 4 show an embodiment of an attachment assembly of an apparatus in accordance with the present invention, in the form of an attachment assembly for a hand, as shown, for the right hand of a patient. The objective is to achieve a substantially inelastic attachment to the hand such that a gyroscope assembly mounted to the attachment is substantially immovable with respect to the hand such that the stabilising forces of the gyroscope assembly are substantially fully transferred to the hand.

The attachment assembly includes a first plate 20 formed of a material which provides that the plate is substantially stiff, in the sense of not being easily deformed or having no more than a small degree of flexibility across the dimensions of the plate. A very wide range of materials is suitable for this task, including polymeric materials, metals, alloys, wood and composite materials. Suitable polymeric materials include acrylonitrile butadiene styrenes, polylactic acids, polypropylenes, polyurethanes, polyacrylates, polyamides and polycarbonates, and may be injection moulded or cast, or cut from sheet materials, with shaping where required.

In certain embodiments, the first plate 20 is rigid, in the sense of being inflexible or not being able to be bent or deformed out of shape.

In preferred embodiments, the first plate 20, as formed, has a tensile strength in the region of about 20 MPa or greater, optionally up to about 300 MPa.

As shown, first plate 20 is shaped to correspond substantially with the contours of the back of the hand. In certain examples, the shape of the first plate is determined by measuring the patient and manufacturing a patient-specific first plate. In other examples, a modular system is developed in which each element is available to a prescribing clinician in a range of sizes and shapes, to correspond with a full range of hand sizes and shapes.

In preferred embodiments, first plate 20 is formed with a plurality of ventilation apertures to allow normal temperature and humidity regulation to be maintained and includes a mounting plate 21 to an operatively upper surface of which the gyroscope assembly may be mounted. In preferred embodiments, the first plate 20 is further provided with a conformal layer to the operatively lower surface, to enhance the fit of the plate to the area of the body, reduce the risk of skin abrasion and thus enhance its comfort to the wearer. Suitably, the conformal layer is a relatively thin layer of a compressible medium, such as a foam material. The conformal layer needs to be designed and manufactured such that it does not unduly reduce the rigidity of the mount of the gyroscope assembly to the area of the body. The conformal layer may also include anti-microbial coatings, odour-reducing coatings and/or anti-bacterial treatments. In certain embodiments, the conformal layer is formed of a non-Newtonian material that provides comfort but stiffens under higher strain rates, thus increasing force transmission.

FIG. 4 shows a second plate 30, shaped to provide a surface against which first plate 20 can be secured with the area of the body selected for treatment clamped therebetween. Second plate 30 is formed of a material having sufficient rigidity to cooperate with first plate 20 to maintain reliable location of the gyroscope assembly adjacent the selected area of the body. Those materials suitable for the first plate 20 are also suitable for the second plate and may have the same rigidity or a different rigidity, typically depending upon the specific area of the body. For example, in the embodiment shown, the second plate is in the form of a palmar plate 30 and it may be appropriate for the palmar plate 30 to have a lower rigidity in order to allow palmar plate 30 to be thinner than first plate 20 such that it impedes movement of the fingers and thumb less than might otherwise be the case. However, there may also be levels of tremor condition which indicate a more rigid palmar plate 30. As shown, in preferred embodiments, second plate 30 is perforated 31.

In the embodiment shown in FIGS. 3 and 4, the first and second plates 20,30 are conveniently secured together by means of one or more adjustable straps 35 (omitted for clarity in FIGS. 3 and 4 but shown in FIG. 1) passing through strap links 32. The adjustable straps are arranged such that the hand can be clamped between the two plates and a sufficient compression force applied to the body to maintain the gyroscope assembly in its correct position and prevent movement of the gyroscope assembly out of its correct positioning. The compression force can be considered to be represented by a clamping force between or across the two plates. Suitably, the compression force is about 50 N or more, for example about 100 N or more. Suitably, the clamping force is about 300 N or less, for example about 200 N or less.

Those skilled in the art will be readily able to devise suitable strapping arrangements. The straps 35 may be secured by means of a hook and loop type fastening or by snap studs, for example. Equally, other arrangements may be used, such as laces, including self- or auto-tightening laces, or a single-direction actuation ratcheting lacing system, as are known in the art of fastening arrangements. Other arrangements for providing the desired compression force will be apparent to the skilled person.

In preferred embodiments, the straps are able to maintain, when in use, a strap tension of about 0.3 Nm.

In preferred embodiments, the straps 35 include progressive wear indication, to indicate in advance when the straps may need replacing. For example, stretch or tear marks may indicate the degree of wear.

In order to maintain correct positioning and clamping of first and second plates 20,30, the straps 35 are substantially inelastic such that any likelihood of the plates moving through stretching, during use, of the straps is minimised. In certain embodiments, substantially inelastic straps include a skin-facing liner, which may be elastic, to provide comfort to the wearer.

In the preferred embodiment shown, the inelastic adjustable straps 35 define, in combination with palmar plate 30, an inelastic support system for the first plate and, consequently, for the gyroscope assembly, which retains excellent force transmission efficiency from the gyroscope assembly to the intended focus of the tremor stabilisation force.

Either or both plates 20,30 may include flexible joint or fold lines to facilitate increased mobility of the palm. This has been found to increase patient satisfaction and proprioceptive feedback.

In an alternative embodiment, not shown, first and second plates are formed as a contiguous unitary element.

In alternative embodiments, not shown, the gyroscope assembly is mounted to an elongate strap which can be wound around the body area to be treated. Sports tape, such as that used to bind the hands in muay thai boxing, has been found to provide a suitable support.

In the arrangement of U.S. Pat. No. 6,730,049, whilst attenuation of tremors may be at least partially successful, it is at the substantial loss of normal mobility of the hand and arm. Accordingly, in preferred embodiments, the first and second plates are shaped such that they do not impede fine motor motion, such finger or hand grip movements. As seen in FIG. 3, the illustrated embodiment is dimensioned and shaped to leave the joints of the fingers and thumb substantially clear of the plate.

Figure 5:
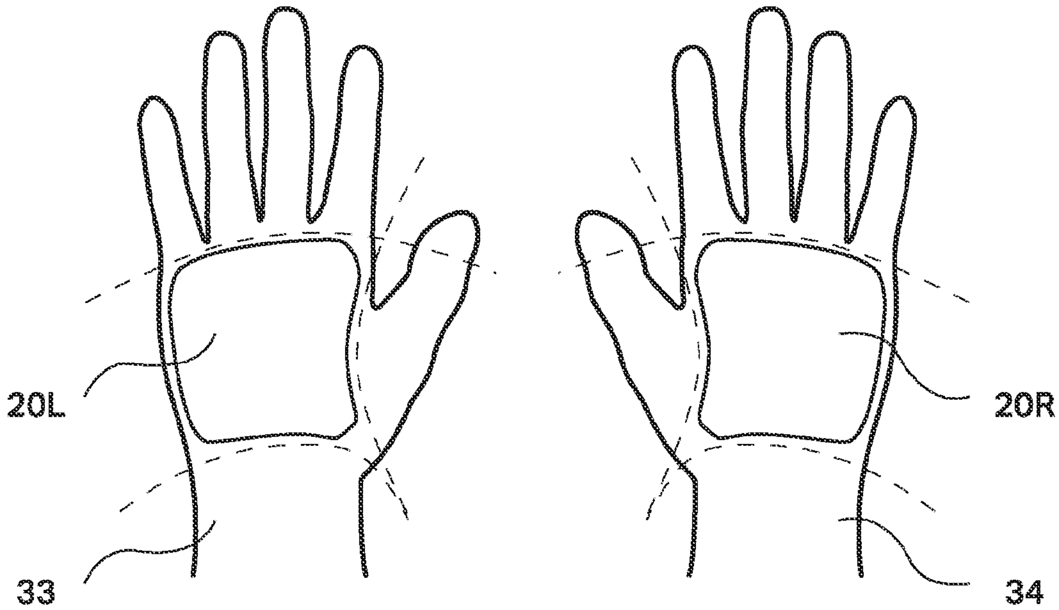
FIG. 5 is a plan schematic view illustrating sizing considerations for a first plate of an embodiment of an apparatus in accordance with the present invention.
Figure 6:
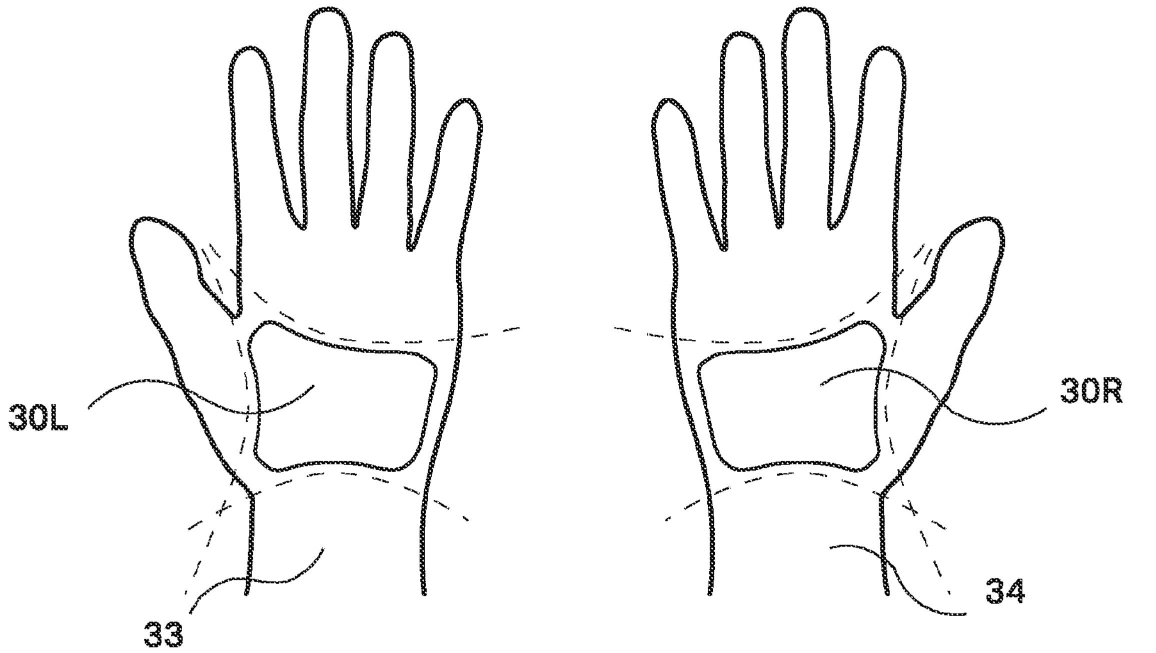
FIG. 6 is a plan schematic view illustrating sizing considerations for a second plate of an embodiment of an apparatus in accordance with the present invention.

This is illustrated further in FIGS. 5 and 6. FIG. 5 shows, in plan view, suitable sizing and shaping for the first, or upper, plates on the left 33 and right 34 hands. Each plate 20L, 20R generally follows the natural slant at the side of the hand towards the little finger up to, but stopping short of, the knuckles; follows the general curvature of the knuckles, and provides a concave profile around the thumb joint. The plate has a generally rounded profile towards the little finger side to ensure that when the patient sets their hand down on a surface, there is no rigid material getting in the way. In the preferred embodiments, the plate has a concave profile around the wrist area, directed concavely towards the centre of the hand, to allow for natural flexion of the wrist around the wrist joint and prevent pinching of skin or flesh around the wrist. Three dimensionally, the plate confirms to the natural curvature of the distal transverse arch with relative tangent curvatures conformal to the longitudinal arch and proximal transverse arch.

FIG. 6 shows, in plan view, typical sizing and shaping for the second or palmar plates on the left and right hands. Each plate 30L, 30R has a top boundary dimensions to lie below the distal palmar crease and is contoured around the metacarpals opposite the thumb to, as discussed above, ensure that when setting the hand down with the little finger lowermost there is no rigid material getting in the way. In the preferred embodiments, the second plate is also contoured to follow the natural arch of the hand at rest. Three dimensionally, the palmar plate also confirms to the natural curvature of the distal transverse arch with relative tangent curvatures conformal to the longitudinal arch and proximal transverse arch; and also conforms to the flesh protrusion on the arch of the hand along the longitudinal arch.

Advantageously, the attachment means for wearing the gyroscope on the hand or other part of the body includes a visual indication means for indicating that the correct tension has been applied.

Figure 7:
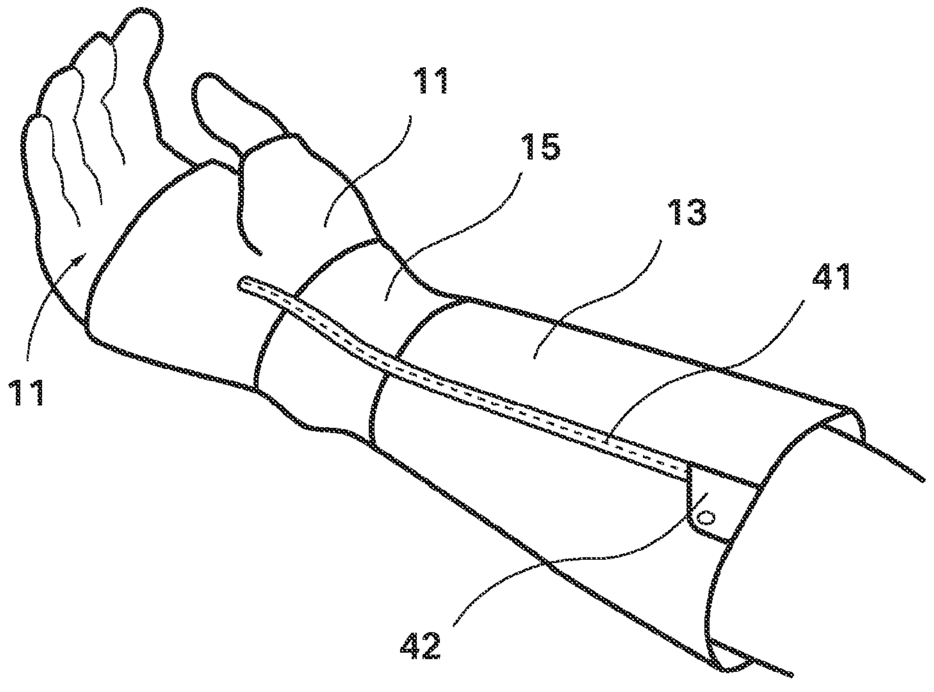
FIG. 7 is a perspective view of a gauntlet of an embodiment of an apparatus in accordance with the present invention.

A modification is shown in FIG. 7 which shows the underside view of a gyroscope assembly support in the form of a glove or gauntlet 40. In the form of a gauntlet 40, the gauntlet acts as a platform for both the gyroscope assembly 10 and its associated power pack 12. In some embodiments, this obviates the need for a discrete connection between the components, including any sensors which may be included, as will be described below. As such, the gauntlet is a particularly advantageous platform for the apparatus.

Many materials are suitable for construction of the gauntlet or glove but the construction needs to be compliant with the requirements outlined above in respect of providing a substantially inelastic mounting for the gyroscope assembly. Accordingly, the gauntlet will, in general, be custom fitted for an individual patient. FIG. 7 also highlights the anatomical areas of the limb—the hand 11, the forearm 13 and the wrist 15. Suitable materials include fabrics woven, spun or knitted from fibres within a polymer support and include polyester, polypropylene, wool, polyamide, cotton, elastane and polychloroprene. Polychloroprene (neoprene) has been found to be particularly suitable base polymeric material for the gauntlet.

Suitably, the gauntlet 40 also includes a first plate 20 integral with the gauntlet fabric to receive the gyroscope assembly. In some embodiments a second or palmar plate 30 is also included, suitably formed integrally with the gauntlet fabric.

In some embodiments, the compressive strength of the fabric of the glove or gauntlet provides sufficient compressive force to the hand to maintain the correct positioning of the gyroscopic assembly. Accordingly, in some embodiments, the gyroscope attachment assembly is formed integrally with the gauntlet or glove. The compressive force of the fabric against the skin also provides additional support for the wearer, which some wearers find highly reassuring.

4D fabrics, fabrics which are capable of stretching in four directions, are especially suitable for our purposes. CNC weaving machines can be programmed to vary the lay up of warp and weft of woven fibres horizontally, vertically and diagonally as weaving progresses and are able to load a range of fibres during the weaving process without interruption or stoppage of the process. For example, the weave density and concentration patterns can be varied throughout weaving of the gauntlet, as can the thread colour, material, elasticity and gauge, allowing the weaving of a single fabric component having a plurality of elasticity, flexibility and other characteristics in different areas of the fabric. A unitary fabric component can be produced having a plurality of zones with different elasticities, for example. The fabric geometry can be varied, rather than necessarily weaving a rectilinear sheet requiring cutting and finishing. Perforations can be formed in the fabric easily. The use of computer-controlled weaving machines allows for a one-piece construction rather than requiring the cutting of a multiple component pieces from a pattern, which pieces then require stitching to form the product. There is also less wastage of fabric.

As shown in FIG. 7, a preferred embodiment of the gauntlet platform includes a longitudinal zip fastener 41 most conveniently running longitudinally along the underside of the arm and orientated such that mounting the gauntlet to the arm involves pulling the zip puller in a direction from the hand towards the elbow. A tab 42 provides a cover for the zip puller in the closed configuration. Since applying the gauntlet implies applying a degree of compression to the limb to maintain the correct positioning of the gyroscope assembly, fitting of the gauntlet and closure of the zip fastener are more easily achieved with a pulling action away from the hand.

The zip fastener has the advantage that the cuff or gauntlet can be temporarily split, terminating approximately 1 cm above the wrist joint towards the palm, to aid application and removal of the apparatus, in particular, by opening out the gauntlet in the wrist area, which is otherwise the narrowest point of the gauntlet. The zip provides a tracked or guided closure path, making it easier for a patient exhibiting tremors to apply without assistance. The same advantages can be achieved with alternative fastenings aligned linearly along the gauntlet.

Figure 8:
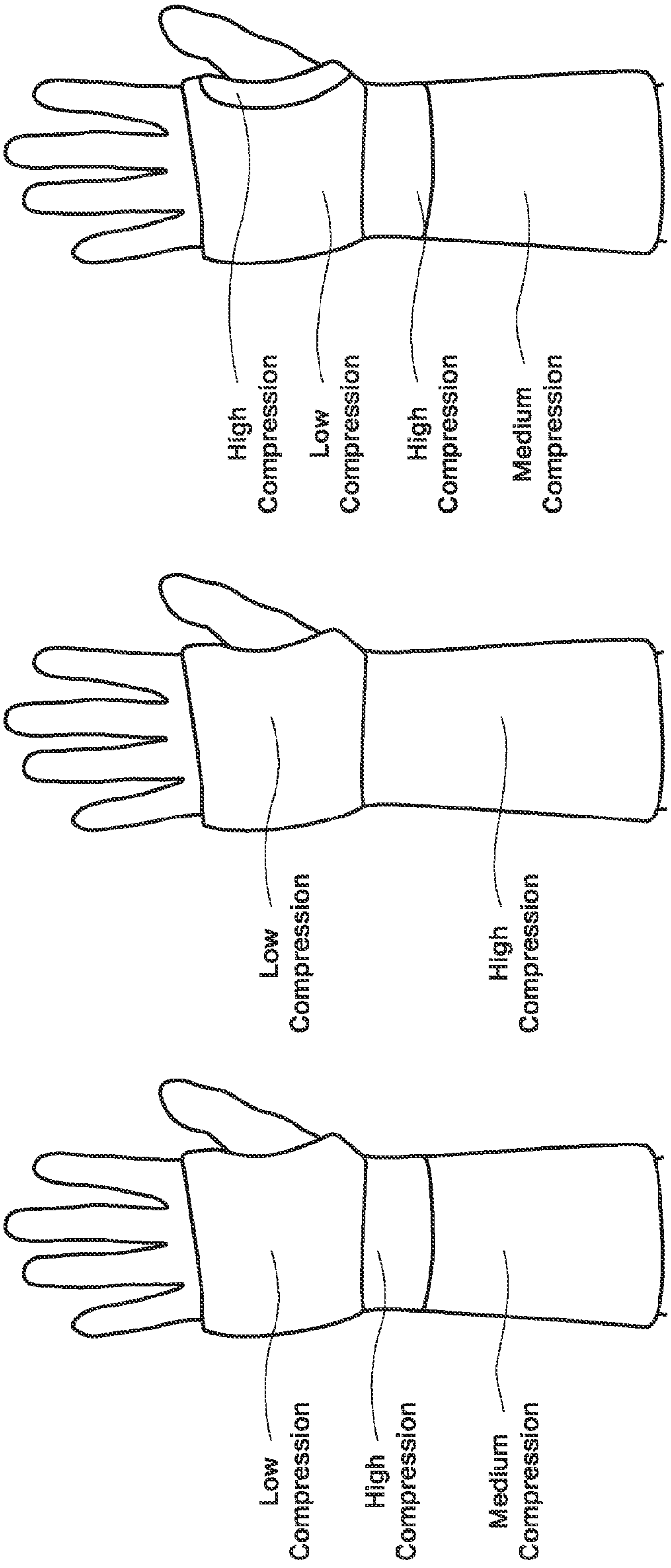
FIG. 8 shows schematic plan views of the compression characteristics of various embodiments of an apparatus in accordance with the present invention.
Figure 9I:
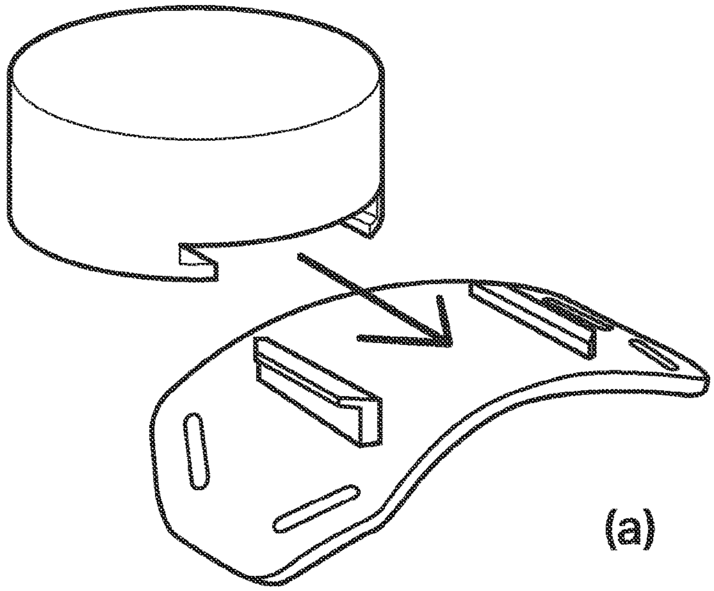
FIG. 9 shows various gyroscope assembly mounting arrangements of embodiments of apparatus in accordance with the present invention.
Figure 9I:
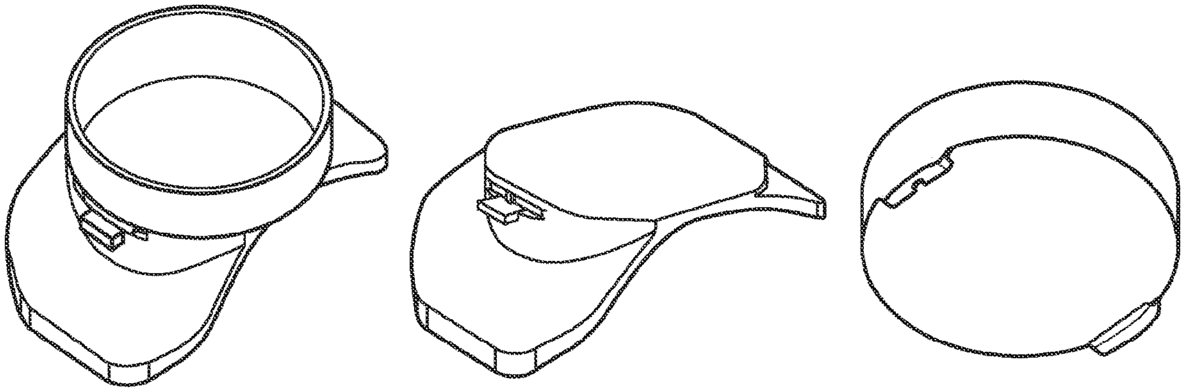
Figure 9I:
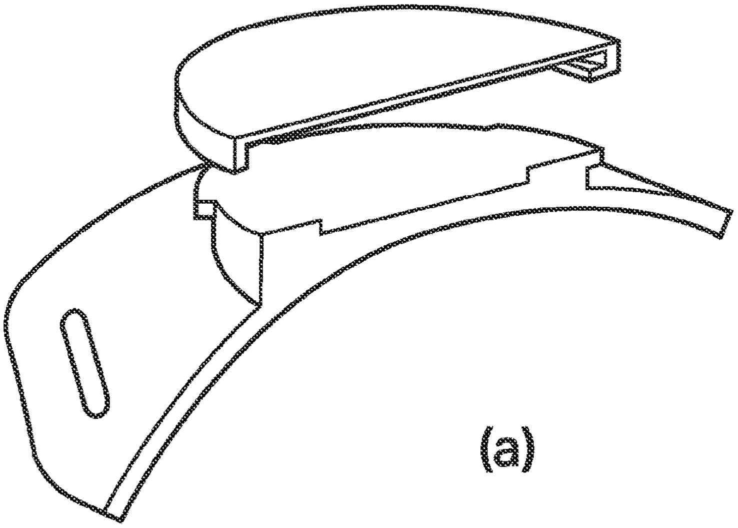
Figure 9I:
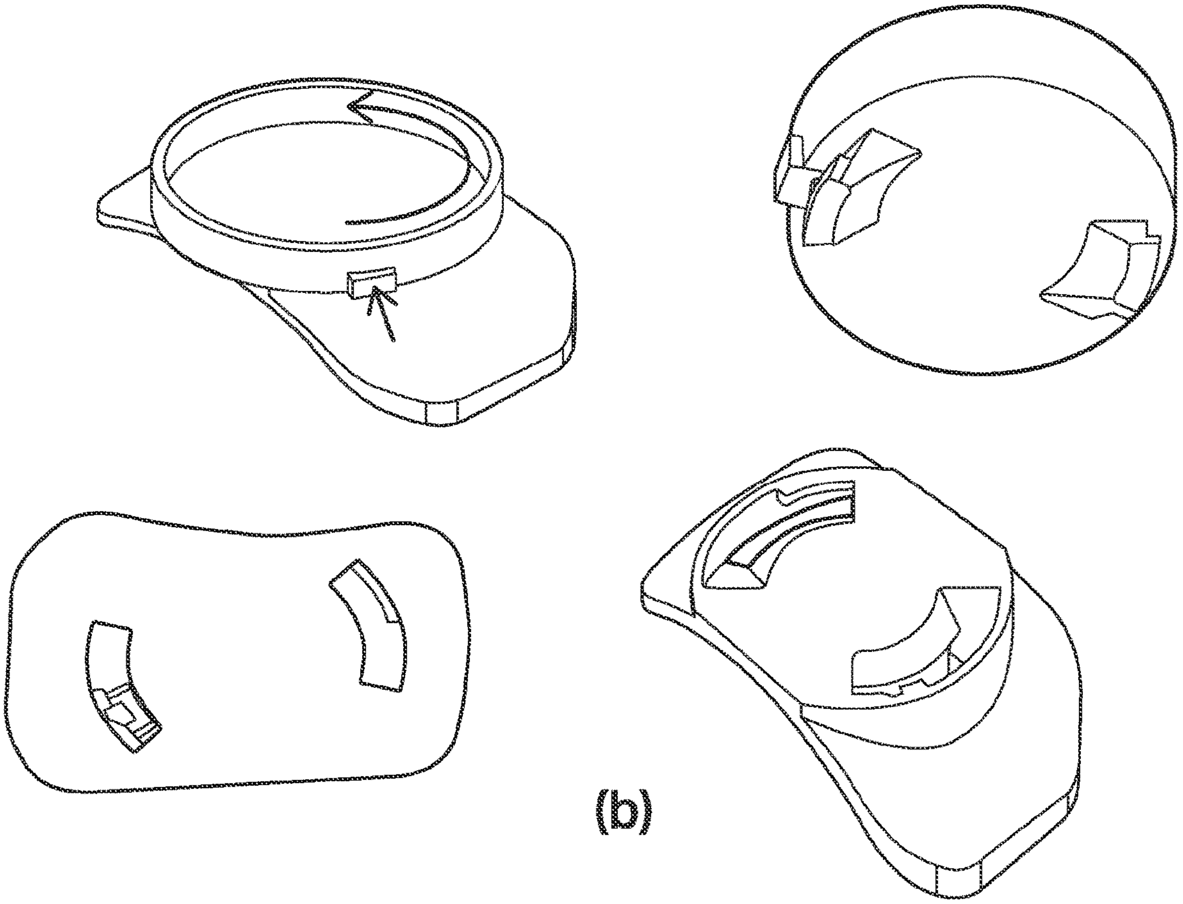

The fabrication of the gauntlet can provide for a range of compression strengths along its length. In trials, patients found that the compressive characteristics of the gauntlet could be tailored to provide a good degree of passive tremor stabilisation. This is illustrated in FIG. 8, which shows three example compression configurations. In FIG. 8(*ii*), the gauntlet provides high compression to the wrist area with comparatively low compression to the hand area and medium compression to the lower arm. FIG. 8(*ii*) shows a two-zone configuration with high compression to both the wrist and lower arm; and FIG. 8(*ii*) shows a variation of the configuration of FIG. 8*i* with a localised high compression area around the thumb joint.

In preferred embodiments, the compression provided by the various zones of the gauntlet is in the range from about 1.7 kpa to 4.8 kpa (13 mmHg to 36 mmHg) as measured according to BSI Standard 661210:2018.

The gyroscope assembly may be mounted to its gyroscope assembly mount by any suitable means. In preferred embodiments, the gyroscope assembly is demountably attachable to the first plate 20. This allows the gyroscope assembly to be removed to allow the support to be cleaned or replaced. Suitably attachment systems are illustrated in FIG. 9 which illustrates, for example purposes only, two variations of an attachment with a sliding lock type arrangement (FIG. 9*i* (a) and (b)), bayonet mounts (FIG. 9*ii* (a) and (b)) and twist-to-lock type arrangements (FIG. 9*iii* (a) and (b)).

In certain embodiments, the apparatus further includes a joint stabilisation brace. The joint stabilisation brace provides a link across a joint to provide additional stabilisation across the joint. For example, in the context of tremors of the hand, a joint stabilisation brace includes a link from the gyroscope assembly or gyroscope mount applied to the back of the hand as described above to a mount worn above the wrist on the lower arm. The brace may act as a joint movement retardation device which applies a retardation force to the second end of the linkage to counter flexing of the joint.

A series of exemplary joint stabilisation braces are shown in FIGS. 10 to 16. Generally speaking, each brace includes at least one generally elongate linkage having first and second ends. A first end of the elongate linkage is coupled to the gyroscope mount or the gyroscope assembly and the second end is coupled to the lower arm mount. The linkage may be substantially rigid or, in some embodiments, may be elastic.

Figure 10:
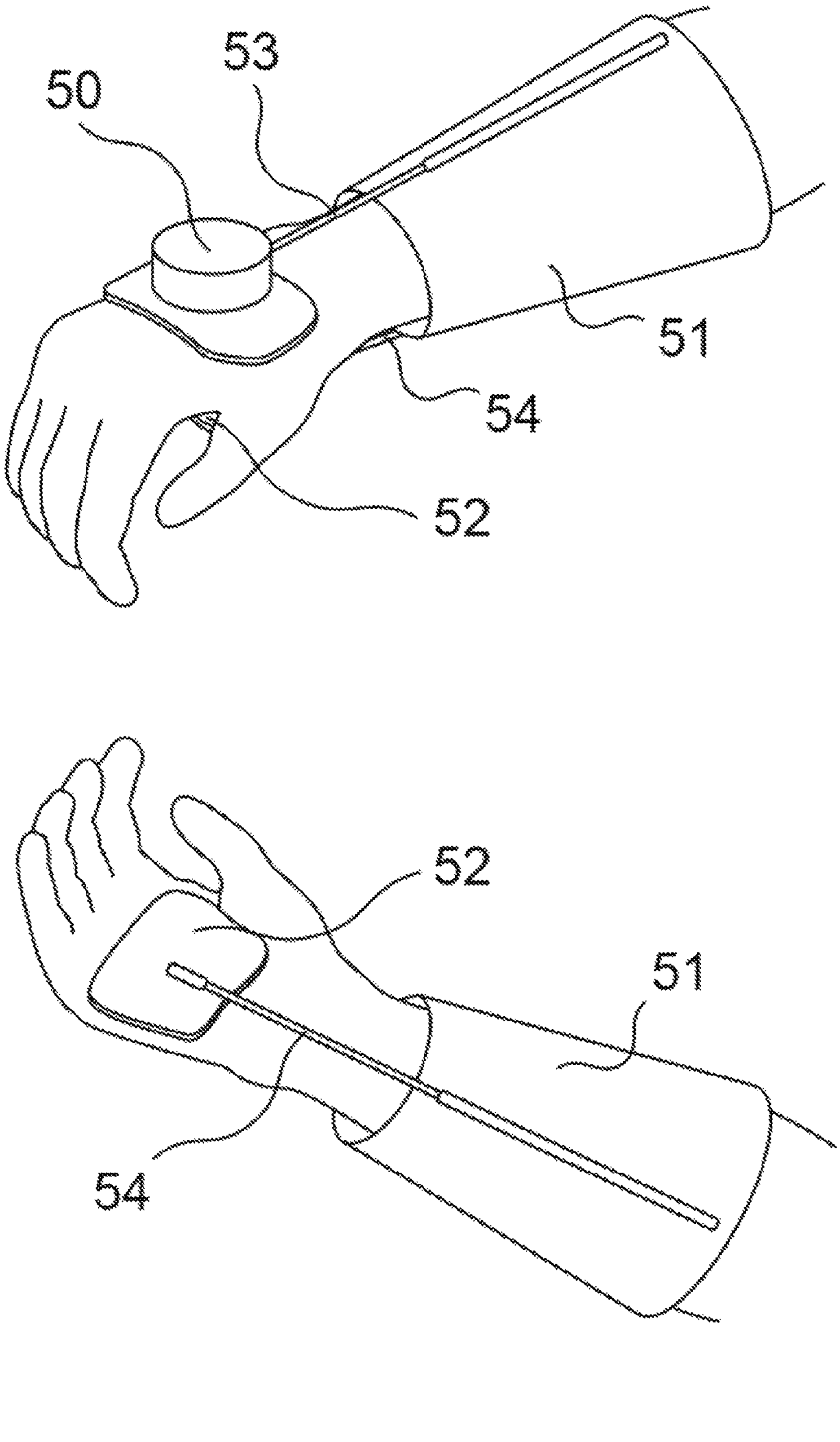
FIG. 10 is a perspective view of a second embodiment of an apparatus in accordance with the present invention.

A first embodiment is shown in FIG. 10, which represents an arrangement acting on an elastic hysteresis-type model. A gyroscope assembly 50 is mounted to a first plate (omitted for clarity) for mounting to the back of a hand of a patient as described above. A lower arm mount is provided in the form of a cuff 51, wearable on the lower arm of the patient. The cuff is constructed such that it will remain reliably in position as the apparatus is worn. It will be appreciated that the support in the form of a gauntlet as described above will be particularly advantageous in this regard as the cuff may be integrated within the fabric of the gauntlet. The apparatus further includes a palmar support 52 as described above. The joint stabilisation brace further includes a pair of elastic members, positioned on opposing sides of the wrist joint and substantially perpendicularly aligned with pivot axis of the wrist, a first elastic member 53 being on the inner face of the arm and a second elastic member 54 being on the outer face of the arm. Flexing of the wrist in one direction from rest extends one of the elastic members, which acts to bring the wrist back to the rest position. For example, flexing the wrist to close the angle between the palm of the hand and the inner face of the forearm causes elastic extension of second elastic member 54, which then acts to return the hand to the rest position. In modifications, additional elastic members are provided, spaced about the axis of the wrist.

Figure 11:
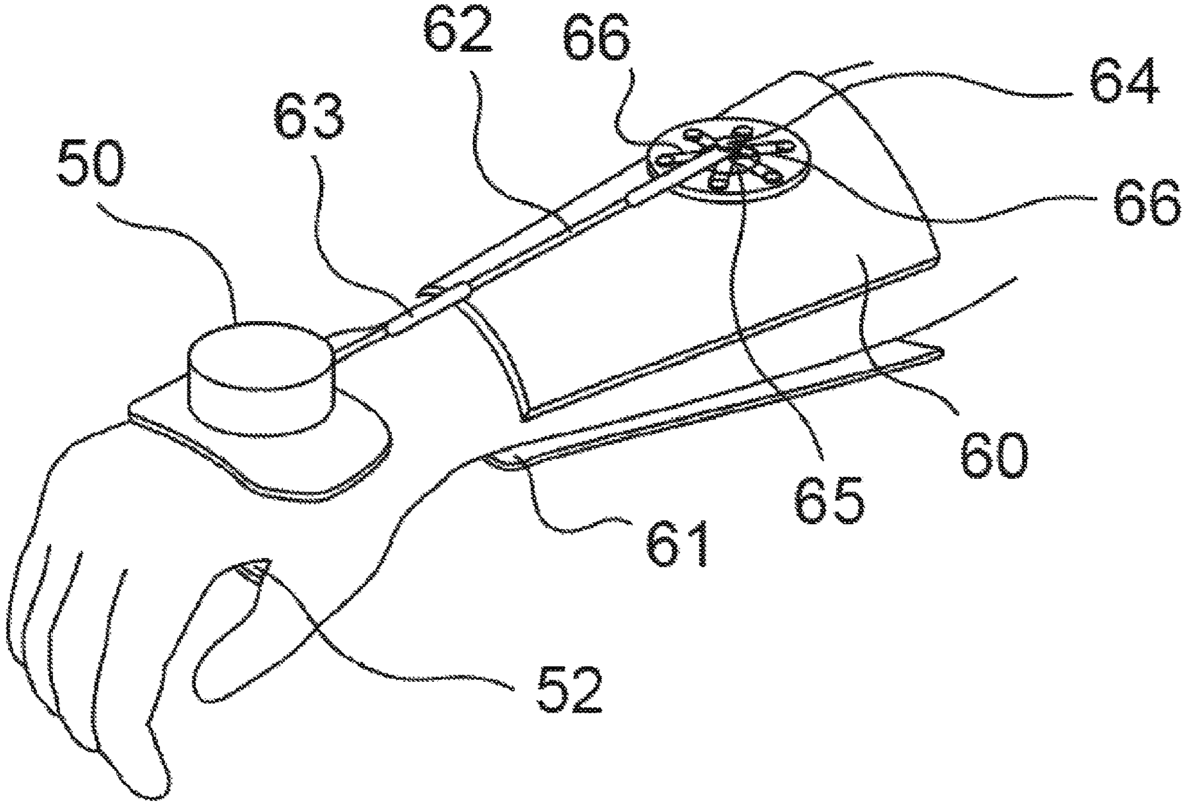
FIG. 11 is a perspective view of a third embodiment of an apparatus in accordance with the present invention.

An alternative embodiment is shown in FIG. 11 which operates on a frictional control basis. In this embodiment, the hand-mounted components of the apparatus are broadly similar to the embodiment of FIG. 9, including a gyroscope assembly 50 with associated mounting plate (omitted for clarity) and palmar support 52. The lower arm mount comprises an upper plate 60 and a lower plate 61 held in place on the forearm by substantially inelastic straps (omitted for clarity) of the type described above. The two components are coupled through a rigid link 62. Link 62 is coupled at a first end to the gyroscope assembly or its mount with a universal joint 63. Universal joint 63 allows the user to maintain substantially unimpeded rotational use of the wrist. The second end of link 62 is provided with an enlarged head 64 which is arranged to move within a circular cup 65 mounted to the upper plate of the lower arm mount. Motion of the wrist is constrained by frictional forces between the enlarged head 64 and the cup 65. The arrangement further comprises a biasing means which acts to return head 64 to a central position within cup 65. In the embodiment shown, the biasing means comprises three resiliently elastic bands 66 aligned with three radially and equally spaced diameters of cup 65. The elastic bands 66 act on a stem of enlarged head 64 to return head 64 to a central position within the cup 65 in response to movement of the wrist, transmitted through link 62. It will be appreciated that one of the elastic bands 66 is advantageously mounted across cup 65 perpendicularly to the axis of link 62. Alternative biasing means will be apparent to the skilled person. For example, the biasing means may comprise a compressible elastic disc, such as a rubber disc, mounted within the cup 65.

Figure 12:
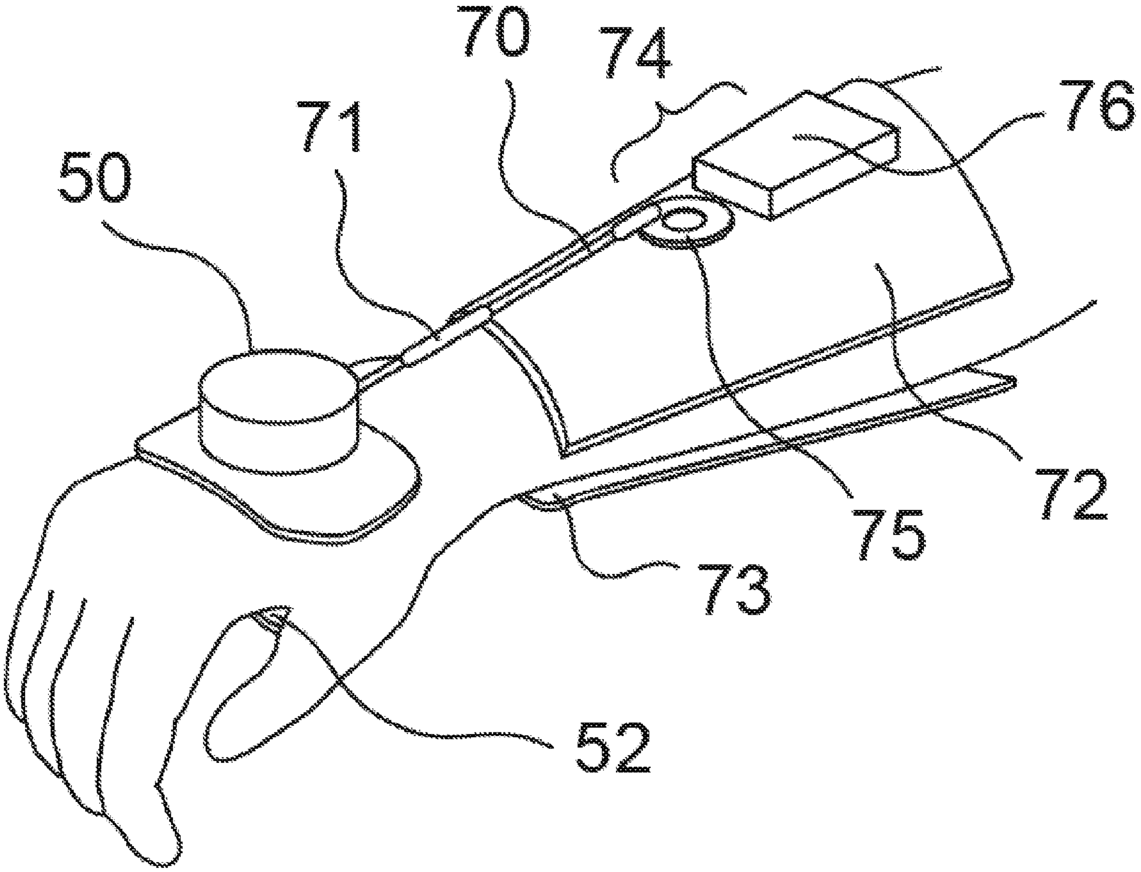
FIG. 12 is a perspective view of a fourth embodiment of an apparatus in accordance with the present invention.

A yet further embodiment is shown in FIG. 12. The hand-mounted part of the assembly is the same as that illustrated and described in respect of FIG. 11 above and a substantially rigid link 70 is coupled to the hand-mounted part at a first end with a universal joint 71. The forearm-mounted component again includes upper 72 and lower 73 plates which, by means of substantially inelastic straps (not shown) resiliently hold the assembly to the lower arm. Mounted to the upper plate 72 is an electromagnetically actuatable disc brake assembly 74 to which the second end of link 70 is operatively coupled. The disc brake assembly acts to slow movement of the second end of link 70 and thus also slow movement of the hand with respect to the forearm. As shown, the assembly 74 includes a brake disc arrangement 75 and a battery and control unit 76. However, it will be appreciated that the battery and control unit functions may conveniently be incorporated into power supply and control unit for the apparatus as a whole. The arrangement includes a sensor to sense a movement of the second end of the linkage and actuates the electromagnetically actuatable disc brake in response to an input from the sensor, to apply a braking force to the second end of the linkage.

Figure 13:
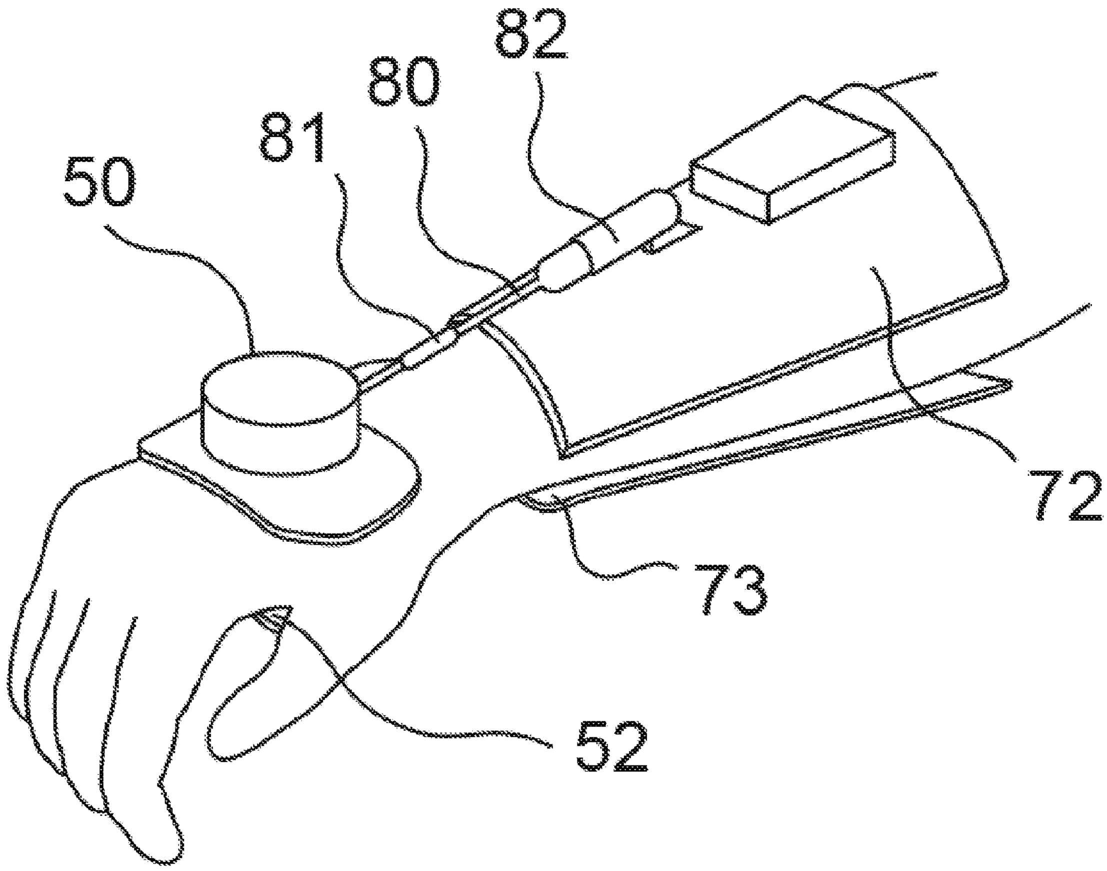
FIG. 13 is a perspective view of a fifth embodiment of an apparatus in accordance with the present invention.

FIG. 13 shows a modification of the arrangement of FIG. 12 in which the link 80 is substantially rigid and includes a universal joint 81 at a first end which is linked to the gyroscope assembly or gyroscope assembly mount as described above, but the second end of link 80 is mounted to upper plate 72 with a dashpot 82, a mechanical damping device which resists, but does not prevent, motion by means of viscous friction.

Figure 14:
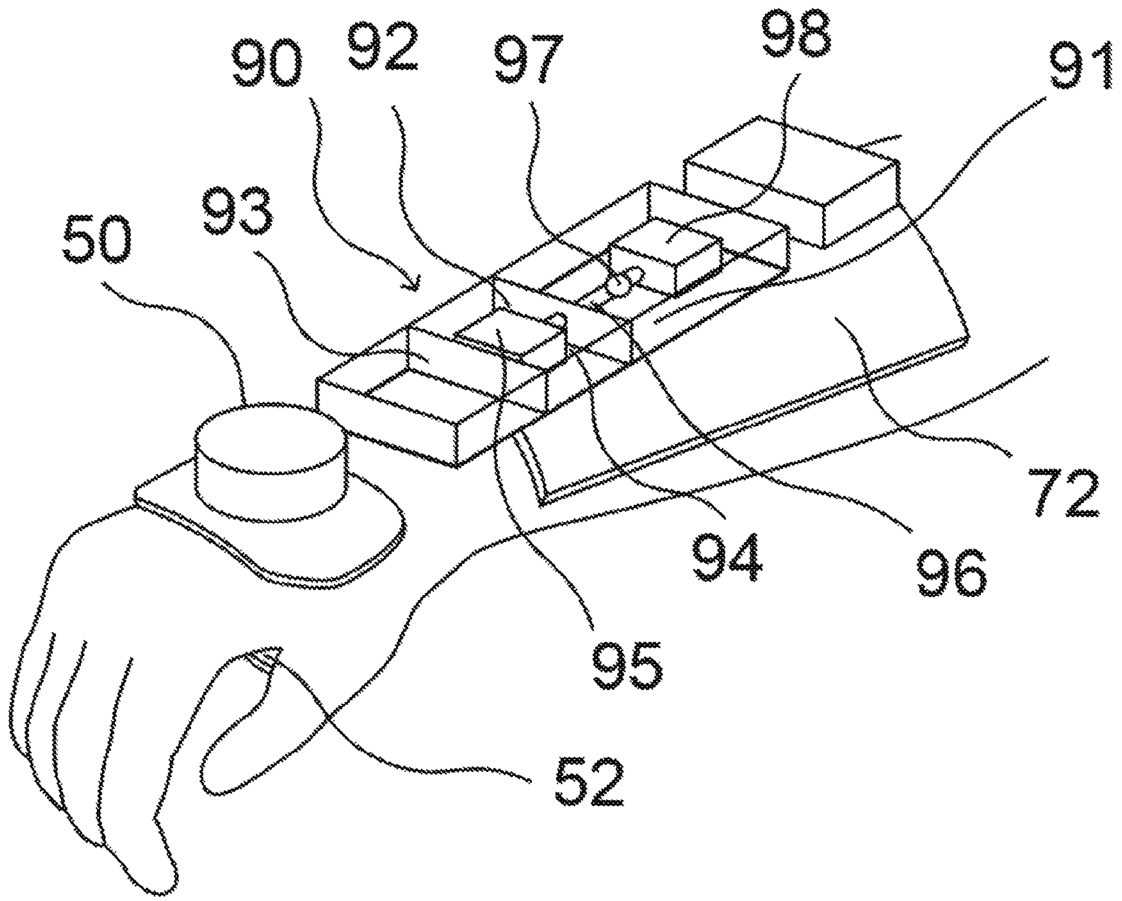
FIG. 14 is a perspective view of a sixth embodiment of an apparatus in accordance with the present invention.

FIG. 14 shows a yet further embodiment in which the link 90 between the gyroscope assembly or mount and the forearm-mount is a fluid damper within a flexible housing 91. The housing a pair of rigid compression plates, a proximal compression plate 92 and a distal compression plate 93. Compression plates 92,93 divide the link into compartments with a flexation compartment 94 being formed between the two plates and substantially overlying the wrist of the patient. The flexation compartment includes a distal reservoir 95 which contains a hydraulic fluid and which is coupled, through a conduit 96 and a control valve 97 to a proximal reservoir 98. As the wrist of the patient is flexed, flow of hydraulic fluid between the reservoirs is controlled to damp movement about the wrist.

Figure 15:
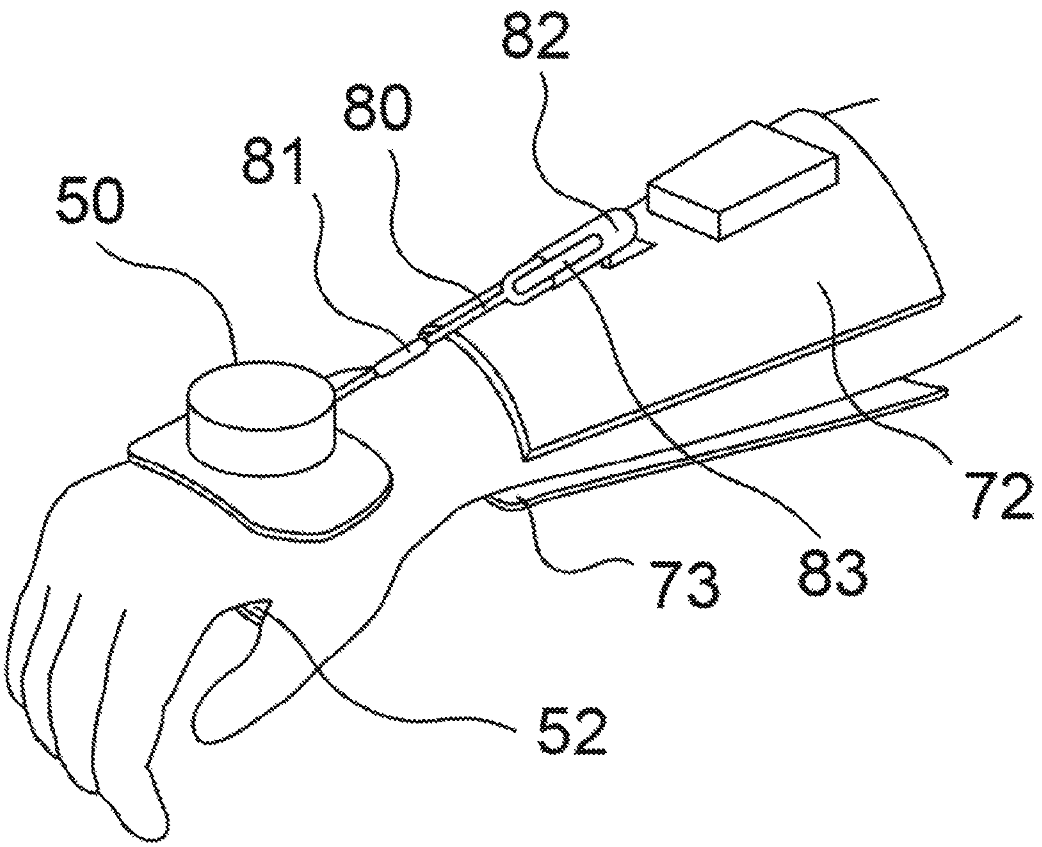
FIG. 15 is a perspective view of a seventh embodiment of an apparatus in accordance with the present invention.

FIG. 15 shows a modification of the arrangement of FIG. 13 in which the dashpot is a dashpot 83 having a controllable bypass channel. The bypass channel allows relatively unrestricted flow of fluid in one direction and thus allows substantially free movement of the wrist in the direction corresponding with the direction of the bypass channel. By providing a controllable bypass channel, the degree of free movement can be tuned to a particular patient's level of tremor and, through a feedback system, can be adjusted as the severity of tremors varies during the day, for example.

Figure 16:
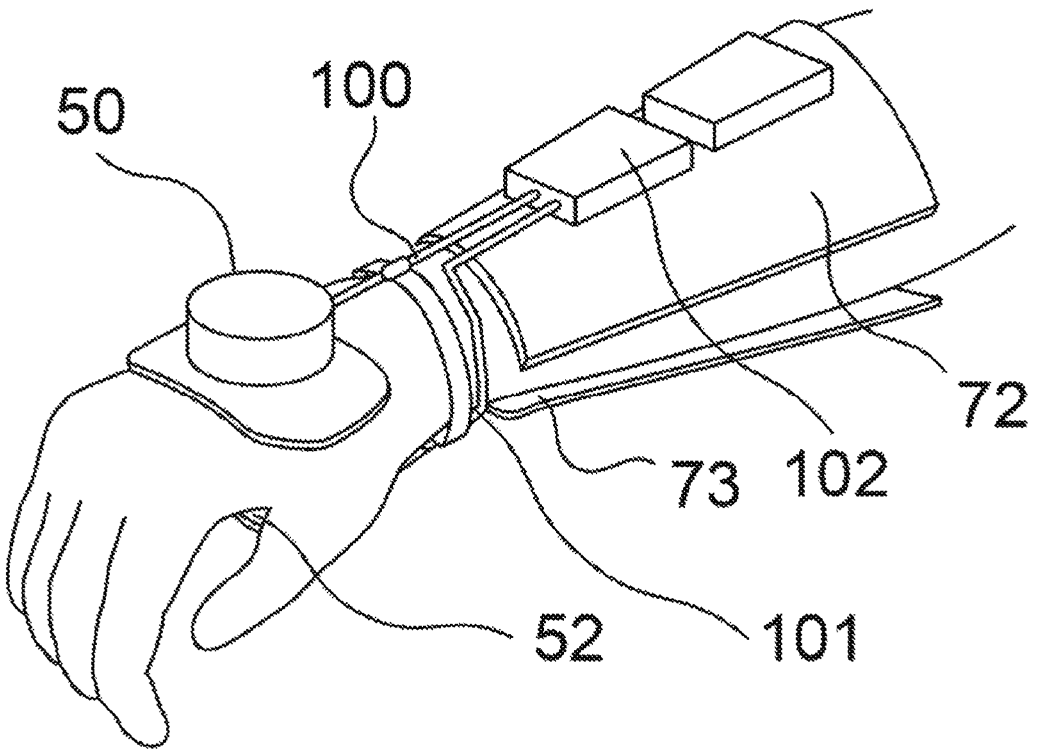
FIG. 16 is a perspective view of an eighth embodiment of an apparatus in accordance with the present invention.

A further embodiment is illustrated in FIG. 16 and can be considered to be a modification of the elastic hysteresis model of FIG. 10. In this embodiment, the elastic members are replaced by upper and lower Bowden cables 100,101 electrically, pneumatically or hydraulically actuated by means of respective linear actuators of a linear actuator module 102.

The apparatus may optionally include further components, useful for enhancing the functionality of the product. For example, the present applicant has determined beneficial implementations of active and passive haptic feedback, including:

- Proprioception: Sensing where the user's hand is in 3D space. IMU-sensor based feedback is used to impart tactile stimulation to the body in order to provide the user with assistive and immediate feedback on the movement and position of the extremities. Actuators can be (but are not limited to) vibration motors (eccentric rotating mass, Linear resonant actuators), electrical stimulation, ultrasonic transducers, magnetorheological fluids, linear actuators (such as solenoids and servo motors) and reaction wheels.
- Reactive tactile stimulation: Using sensor data processing techniques such as machine learning, an array of tactile actuators can be implemented in a glove along with electronic inertial measurement units to sense the position and movement of the extremities. Real-time sensor data is processed and the tactile actuators are excited in randomly generated, previously undetermined patterns with the goal of reducing involuntary motion. The excitation patterns are constantly altered by the software in response to the sensor data, with patterns producing the most significant reduction in tremor activity being reinforced. The system is then able to learn the most effective patterns to apply which are bespoke to each user.
- Non-reactive tactile stimulation: Simple tactile stimulation, such as low-level vibration, assists with alleviation of tremor related symptoms and leads to overall reduction in the disruptiveness of the tremors experienced by the user. This form of stimulation does not rely on positional sensing of the extremity and therefore does not react to the motion of the user. The stimulation pattern can then be a simple selectable preset.
- Elastic compression: Elastic compression elements in the gauntlet, coupled with rigid plates provide effective support, particularly around the wrist joint. This interferes with the tremor and helps mitigate some of the negative tremor effects. This may be worn without a gyroscope unit attached during certain activities (e.g. during sleep or bathing).

Although described above predominantly in respect of alleviation of hand tremors, the present invention is equally suitable for application to other areas of the body. In particular, it will be particularly appreciated that the apparatus can be readily attached to other limbs, especially the legs, and also to the shoulders, neck and upper arms.

Features of the embodiments described above are equally applicable to tremor reduction and stabilisation devices which do not include a gyroscope. This forms an additional aspect of the present invention.

The present invention provides an apparatus for reducing the effects of tremors on areas of the human body whilst predominantly allowing normal movement of joints in the area to which the apparatus is worn. For example, the apparatus can be worn on the hand or lower arm in a manner which provides stabilisation of tremors without causing incapacity of the hand or arm themselves, as is the case with certain prior art devices which, whilst reducing tremors, do so by substantially immobilising or restricting the movement of the hand or arm. Consequently, the present invention stabilises tremors without impacting on the wearer's ability to carry out everyday tasks, such as lifting drinks or food to their mouths, writing or using a computer keyboard, opening locks and so on. Similarly, when mounted to other parts of the body, such as the thigh, normal bending of the knee joint is not impeded in any way. The present invention provides an apparatus which reduces the effects of tremors without impeding intentional movements desired by the wearer.

The present invention provides a lightweight apparatus and provides an apparatus which resiliently mounts the gyroscope to the location on the body such that the axis of rotation of the gyroscope remains substantially normal to the surface of the body at the location, even during everyday activities, thereby maximising the tremor counteracting force of the gyroscope.

The invention claimed is:

1. An apparatus for reducing effects of tremors on an area of a human body, the apparatus comprising:

a gyroscope device;

an attachment assembly for attachment of the gyroscope device to a location on the human body in the area, wherein the attachment assembly provides an inelastic attachment to the location and comprises a gyroscope mount;

wherein the gyroscope mount comprises a stiff first plate having a shape adapted to correspond with a shape of the human body in the location; and a joint stabilisation component comprising an elongate linkage having a first end and second end;

wherein the gyroscope mount is mountable to the human body adjacent a joint and to a first side thereof;

wherein the first end is coupled to the gyroscope mount and the second end is coupled to a joint movement retardation device mountable to a second side of the joint; and wherein the joint movement retardation device is adapted to apply a retardation force to the second end of the linkage to counter flexing of the joint.

2. An apparatus as claimed in claim 1 wherein the inelastic attachment comprises at least one inelastic strap attachable to the first plate and securable to the location.

3. An apparatus as claimed in claim 1, wherein the inelastic attachment comprises a demountable cuff formed of an inelastic material in the form of a glove or part of a glove attachable to a hand of a person.

4. An apparatus as claimed in claim 1, wherein the attachment assembly comprises a fastening device orientated longitudinally with respect to the area of the human body.

5. An apparatus as claimed in claim 4, wherein the fastening device is a zip fastening device that runs an entire length of the inelastic attachment.

6. An apparatus as claimed in claim 1, wherein the attachment assembly further comprises a second plate mountable to the body such that a compression or clamping force can be applied to the body.

7. An apparatus as claimed in claim 6, wherein the area of the body is a hand;

wherein the first plate is dimensioned so as not to overlie, in use, proximal and distal phalanges of a thumb;

wherein the first plate has an annular sectoral shape having an outer curvature corresponding to the curvature of knuckles of the hand; and wherein the second plate is dimensioned so as not to extend, in use, to the knuckles of the hand or to the proximal and distal phalanges of the thumb.

8. An apparatus as claimed in claim 1, further comprising a visual indicator on the attachment assembly to indicate when the attachment assembly is applied, in use, with a correct force or tension against the location.

9. An apparatus as claimed in claim 1, wherein the gyroscope device includes a gyroscope housing; and wherein the gyroscope housing and the gyroscope mount include mutually interacting elements such that the gyroscope housing is demountable from the gyroscope mount.

10. An apparatus as claimed in claim 1, wherein the attachment assembly further comprises a passive tremor stabilisation component comprising a stretchable fabric shaped and dimensioned to be appliable to or around the location.

11. An apparatus as claimed in claim 10, wherein the component extends beyond the location and provides different compressive characteristics along a length of the component.

12. An apparatus as claimed in claim 1, wherein the joint stabilisation device comprises or further comprises an elastic hysteresis device adapted to apply an elastic stabilising force to the gyroscope mount;

wherein the gyroscope mount is mountable to the human body adjacent the joint and to the first side thereof;

wherein the elastic hysteresis device comprises a band or strap securable to the second side of the joint; and wherein the elastic hysteresis device comprises a linkage comprising first and second elastic members, each member being oppositely disposed above and below a hinge axis of the joint.

13. An apparatus as claimed in claim 1, further comprising at least one vibrational unit.

14. An apparatus as claimed in claim 1, wherein the gyroscope device comprises a plurality of gyroscope devices.

15. A method comprising:

securing a tremor reduction apparatus to an area of a human body;

wherein the tremor reduction apparatus comprises:

a control unit, a gyroscope device, an attachment assembly;

wherein the attachment assembly is configured to attach, by an inelastic attachment, the gyroscope device to a location on the human body in the area, wherein the attachment assembly comprises a gyroscope mount;

wherein the gyroscope mount comprises a stiff first plate having a shape adapted to correspond with a shape of the human body in the location; and a joint stabilisation component comprising an elongate linkage having a first end and second end;

wherein the gyroscope mount is mountable to the human body adjacent a joint and to a first side thereof;

wherein the first end is coupled to the gyroscope mount and the second end is coupled to a joint movement retardation device mountable to a second side of the joint; and wherein the joint movement retardation device is adapted to apply a retardation force to the second end of the linkage to counter flexing of the joint; and controlling, by the control unit, the gyroscope device to exert a force on the location of the human body via precession of the gyroscope device so as to reduce effects of tremors in the area of the human body.

* * * * *